United States Patent [19]

Shiwaku et al.

[11] Patent Number: 5,354,802

[45] Date of Patent: Oct. 11, 1994

[54] RESIN COMPOSITION FOR BLOW MOLDING AND BLOW MOLDED ITEM MADE THEREFROM

[75] Inventors: Toshio Shiwaku; Kenji Hijikata; Kenji Furui; Masato Suzuki, all of Shizuoka, Japan

[73] Assignee: Polyplastics Co., Ltd., Osaka, Japan

[21] Appl. No.: 15,174

[22] Filed: Feb. 11, 1993

[51] Int. Cl.$^5$ .............................. C08J 5/08; C08K 3/40; C08L 31/08

[52] U.S. Cl. .................................. 524/494; 524/404; 524/423; 524/430; 524/437; 524/441; 524/445; 524/448; 524/449; 524/493; 524/495; 524/513; 525/166; 525/176; 525/396; 525/397

[58] Field of Search ............... 524/513, 437, 441, 493, 524/494, 495, 448, 449, 430, 445, 404, 423; 525/166, 396, 397, 176

[56] References Cited

U.S. PATENT DOCUMENTS

| | | | |
|---|---|---|---|
| 5,006,610 | 4/1991 | Nakamura et al. | 525/396 |
| 5,175,204 | 12/1992 | Orikasa et al. | 524/504 |
| 5,189,140 | 2/1993 | Nakane et al. | 528/272 |

Primary Examiner—Paul R. Michl
Assistant Examiner—U. K. Rajguru
Attorney, Agent, or Firm—Nixon & Vanderhye

[57] ABSTRACT

The present invention provides a resin composition enhanced in melt tension and remarkably improved in blow moldability without a parison being drawing down during blow molding, while being freed from the tendency to gelation at high viscosity, maintaining stable flowability and capable of effectively producing a blow molded article of comparatively large size having uniform thickness and excellent appearance.

A resin composition for blow molding prepared by compounding 100 parts by weight of a resin component composed of:

(A) 1 to 99 parts by weight of a thermoplastic polyester resin mainly comprising an aromatic dicarboxylic acid or the ester forming derivative thereof and an aliphatic dihydroxy compound having 2 to 8 carbon atoms and (B) 99 to 1 parts by weight of a thermoplastic polyamide resin with (C) 0.2 to 10 parts by weight of a styrenic copolymer comprising 40 to 97% by weight of styrene, 60 to 3% by weight of a glycidyl ester of an $\alpha,\beta$-unsaturated acid and 0 to 50% by weight of another vinylic monomer and (D) 0 to 100 parts by weight of at least one member among fibrous, granular and plate fillers and kneading the resulting mixture in a molten state.

5 Claims, No Drawings

RESIN COMPOSITION FOR BLOW MOLDING AND BLOW MOLDED ITEM MADE THEREFROM

FIELD OF THE INVENTION

The present invention relates to a polyester resin composition suitable for blow molding, and a blow molded article produced by blow molding this composition.

DESCRIPTION OF THE RELATED ART

Although thermoplastic polyester and polyamide resins having well-balanced, excellent mechanical strength, thermal resistance, chemical resistance and electric properties are widely used as typical engineering plastics, most of them are produced exclusively by injection molding.

Recently, however, the uses of polyester and polyamide resins tend to be highly advanced or specified, and it is expected to produce blow molded articles by efficiently and economically molding these resins by the blow molding method.

For example, piping and tanks placed in an engine room of an automobile have heretofore been made of exclusively metals, since they must be used in a high temperature atmosphere and high mechanical properties, etc., are required of them. It is demanded, however, to produce them by blow molding a thermoplastic resin having the above-described excellent properties for the purposes of reducing the weight, inhibiting the rust and reducing the process cost.

However, it is exceedingly difficult to produce molded articles of desired shapes by blow molding polyester or polyamide resins, since these resins seriously drawn down due to a low melt tension which is the most important property required in these processes. To overcome these defects, a process wherein a polyester or polyamide resin having a high degree of polymerization and a high intrinsic viscosity is used, a process wherein a branched polyester or polyamide is used, and a process wherein a filler is added have been taken into consideration, but the improving effects of these processes are only slight and these materials are yet insufficient for tile processes.

As for polyester resins, & process has been proposed which comprises incorporating a branching agent such as an isocyanate or epoxy compound into a polyester resin in order to improve the melt tension and to prevent the drawdown. This process has, however, defects that the effect thereof is insufficient and the moldability is unstable to make the production of uniform, excellent molded articles difficult.

A process for improving the blow moldability of a polyester resin by improving the melt tension thereof by incorporating an ethylene/$\alpha,\beta$-unsaturated glycidyl ester copolymer into this resin was proposed and, in addition, it is known that the use of a trivalent phosphorus compound in combination with the copolymer is more effective. However, after investigations, the present inventors found various problems such that the ethylenic glycidyl ester copolymer should be added in a relatively large amount and its effect of improving the melt tension and drawdown resistance was recognized to some extent, but was yet insufficient, that particularly a combined use of a trivalent phosphorus compound caused the melt viscosity to be so seriously increased that the intended improvement in the melt tension was slight for the increase in the viscosity, and that even when a preferred melt tension was obtained, the blow moldability was poor and unstable due to poor flowability and, in addition, partial gelation took place to cause tile formed gel to impair the surface state of the molted article.

The inventors found that a combination of the polyester resin with a specified stynenic copolymer was effective in improving the melt tension and drawdown resistance of the polyester resin, and proposed this finding as U.S. patent application No. 07/963,472. However, this composition also has a problem particularly in efficiently producing large blow molded articles such that the composition easily gels and, particularly when it is intended to achieve a sufficient melt tension, the composition tends to gel, whereby it becomes difficult to obtain a stable flowability.

SUMMARY OF THE INVENTION

After investigations made for the purpose of producing a resin composition for blow molding which has melt tension and drawdown resistance sufficient for blow molding, maintains a stable flowability and is capable of efficiently producing blow molded articles of large sizes by a further improvement, the inventors have completed the present invention.

Namely, the present invention provides a resin composition for blow molding prepared by compounding 100 parts by weight of a resin component composed of:

(A) 1 to 99 parts by weight of a thermoplastic polyester resin mainly comprising an aromatic dicarboxylic acid or the ester forming derivative thereof and an aliphatic dihydroxy compound having 2 to 8 carbon atoms and (B) 99 to 1 parts by weight of a thermoplastic polyamide resin with (C) 0.2 to 10 parts by weight of a styrenic copolymer comprising 40 to 97% by weight of styrene, 60 to 3% by weight of a glycidyl ester of an $\alpha,\beta$-unsaturated acid and 0 to 50% by weight of another vinylic monomer and (D) 0 to 100 parts by weight of at least one member among fibrous, granular and plate fillers and kneading the resulting mixture in a molten state; and a blow molded article produced from said resin composition by blow molding.

DETAILED DESCRIPTION OF THE INVENTION

A detailed description will be made on the constituents of the composition of the present invention.

The thermoplastic polyester resin (A) is a polyester produced by polycondensing mainly an aromatic dicarboxylic acid compound and mainly an aliphatic dihydroxy compound having 2 to 8 carbon atoms, and may be any of homopolyester and copolyester.

Examples of the aromatic dicarboxylic acid compounds constituting the thermoplastic polyester resin (A) include known aromatic dicarboxylic acids such as terephthalic, isophthalic, naphthalene-dicarboxylic and diphenyldicarboxylic acids and ester-forming derivatives of them, which can be used either singly or in combination of two or more of them. Among them, those mainly comprising terephthalic acid or an ester-forming derivative thereof are preferred.

Examples of the aliphatic dihydroxy compounds having 2 to 8 carbon atoms as the other main component constituting the polyester (A) of the present invention include ethylene glycol, propylene glycol, butanediol, neopentyl glycol, hexanediol, cyclohexanediol, cyclohexanedimethanol, diethylene glycol and triethylene glycol and substituted derivatives of them, which can be used either singly or in the form of a mixture of two or more of them. Among them, those mainly comprising an aliphatic dihydroxy compound having 2 to 4 carbon atoms are preferred.

Other comonomer components constituting the copolyesters than those described above include dicarboxylic acids such as diphenyl ether dicarboxylic acid, α,β-bis(4-carboxyphenoxy)ethane, adipic acid, sebacic acid, azelaic acid, decanedicarboxylic acid, dodecanedicarboxylic acid, cyclohexanedicarboxylic acid and dimer acids and ester-forming derivatives of them; glycols such as pentanediol, neopentyl glycol, hexanediol, octanediol, decanediol, cyclohexanedimethanol, hydroquinone, bisphenol A, 2,2-bis(4'-hydroxyethoxyphenyl)propane, xylene glycol, polyethylene glycol, polytetramethylene glycol and aliphatic polyester oligomers having hydroxyl groups at both ends; hydroxy carboxylic acids such as glycolic acid, hydroxy acids, hydroxybenzoic acid, hydroxyphenylacetic acid and naphthylglycolic acid; and lactone compounds such as propiolactone, butyrolactone, caprolactone and valerolactone.

Further polyesters having a branched or crosslinked structure formed by using a polyfunctional ester-forming component such as trimethylolpropane, trimethylolethane, pentaerythritol, trimellitic acid, trimesic acid or pyromellitic acid can be used so far as the thermoplasticity can be retained. Polyesters comprising an ester-forming component having an ionic group, such as sulfoisophthalic acid or sodium p-hydroxyethylphenylsulfonate, are also usable.

The polyesters include also halogenated polyester copolymers produced from a compound having an ester-forming group and a halogen-containing substituent on the aromatic ring, such as dibromoterephthalic acid, tetrabromoterephthalic acid, tetrachloroterephthalic acid, 1,4-dimethyloltetrabromobenzene, tetrabromobisphenol A, and ethylene oxide and propylene oxide adducts of tetrabromobisphenol A.

Particularly preferred polyester resins include polybutylene terephthalate and copolymers mainly comprising it. Particularly preferred comonomer components forming the copolymer include, for example, isophthalic acid, ethylene glycol, bisphenol A, cyclohexanedimethanol, 2,2-bis(β-hydroxyethoxyphenyl)propane, 2,2-bis(β-hydroxyethoxytetrabromophenyl)propane and polytetramethylene glycol. Polybutylene terephthalate copolymers having a suitably branched or crosslinked structure produced by polycondensation with a small amount of the above-described comonomer having at least three ester functional groups also belong to the preferred polyesters.

The viscosity of the polyester resin (A) to be used in the present invention is not particularly limited so far as the resin can be injection molded. Usually a polyester resin (A) having an intrinsic viscosity of 0.6 to 2.0 is usable. The feature of the present invention resides in that the blow moldability is remarkably improved by the combination with components (B) and (C) which will be described below even when the viscosity is low. However, the polyester resin (A) which per se has an excessively high viscosity is not preferred, since it reduces the flowability.

The present invention is characterized by using the thermoplastic polyamide resin (B) as a component of the resin for blow molding.

A combined use of the polyamide resin serves to maintain high melt tension and drawdown resistance, reduce the tendency to gelation, maintain a stable flowability, and efficiently produce blow molded articles of large sizes by blow molding in a high cycle in virtue of the effect of coexistence with the component (C) which will be described below. The use of the polyamide resin is thus economically advantageous.

The polyamide resins to be used as the component (B) in the present invention include various well-known polyamide resins. They include polyamide resins produced by polycondensing a dicarboxylic acid such as oxalic, adipic, suberic, sebacic, terephthalic, isophthalic or 1,4-cyclohexyldicarboxylic acid with a diamine such as ethylenediamine, peentamethylene diamine, hexamethylenediamine, decamethylenediamine, 1,4-cyclohexyldiamine or m-xylylenediamine; polyamide resins produced by polymerizing a cyclic lactam such as caprolactam or laurolactam; and polyamide resins produced by copolymerizing a cyclic lactam with a dicarboxylic acid/diamine salt. Among these polyamide resins, preferred are nylon 6, nylon 66, nylon 610, nylon 11, nylon 12 and copolymers of them.

Polyamide elastomer resins are also usable as the polyamide resin (B). The polyamide elastomer resins are polyamide block copolymers comprising a polyamide hard segment combined with another soft segment and having a Young's modulus in flexure of 10,000 kgf/cm$^2$ or below. Typical examples of the soft segment of the elastomer are polyalkylene oxides (the alkylene group having 2 to 6 carbon atoms). Although there are various reports on the processes for synthesizing the polyamide elastomers, they are usually synthesized in two steps, i.e. the step of forming a nylon oligomer and the step of increasing the molecular weight by esterification. The polyamide components usable as the hard segment include polyamides such as nylon 6, nylon 66, nylon 610, nylon 11 and nylon 12. The polyether components usable as the soft segment include polyoxyethylene glycol, polyoxypropylene glycol and polyoxytetramethylene glycol.

The kind of the polyamide resin to be used is suitably selected depending on the intended use and properties of the molded article. Polyamide resins each having a melting point far different from that of the polyester component (A) are not preferred.

The kind of the polyamide resin as the component (B) is not limited to only one but two or more polyamide resins can be used in combination so as to regulate the intended properties.

As for the relative amount of each of the polyester resin (A) and polyamide resin (B), each of them amounts to 1 to 99 parts by weight for 100 parts by weight in total of the resin components (A) and (B). The relative amount of them can be selected within this range so as to obtain the intended properties. When the amount of each of them is below part by weight, the above-described coexistence effect cannot be sufficiently obtained unfavorably.

Since the polyamide resin usually tends to have a high hygroscopicity, the compounding ratio of the polyester resin (A) to the polyamide resin is often preferably 50 to 99 parts to 50 to 1 part in view of this property.

The present invention is characterized by compounding the resin component comprising the resins (A) and (B) with the specified styrenic copolymer (C) and kneading the resulting mixture in a molten state. By compounding the components (A) and (B) with the specified amount of the styrenic copolymer (C), the compatibility of the components (A) and (B) with each other can be so improved as to assist the formation of a homogeneous mixture of them and, in addition, the melt tension and drowdown resistance which are the most important in the blow molding can be remarkably improved to facilitate the blow molding of the composition comprising the resins (A) and (B) which has been impossible in the prior art.

The styrenic copolymer (C) is a copolymer comprising styrene and a glycidyl ester of an $\alpha,\beta$-unsaturated acid as indispensable constituents.

The amount of the styrene unit constituting the copolymer is preferably 40 to 974 by weight, preferably 50 to 954 by weight.

The glycidyl ester of an $\alpha,\beta$-unsaturated acid which is another indispensable constituent of the copolymer (C) is a compound of the following general formula (1):

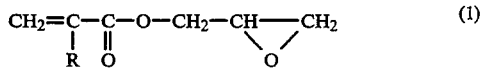

wherein R represents a hydrogen atom or a lower alkyl group, such as glycidyl acrylate, glycidyl methacrylate, glycidyl ethacrylate and glycidyl itaconate, among which glycidyl methacrylate is particularly preferred.

The amount of the glycidyl ester units of the general formula (1) in the styrenic copolymer (C) is preferably 3 to 60% by weight, particularly preferably 5 to 50% by weight. When this amount is too large, the composition is apt to gel, whereby a problem of blow modabillty is posed and the surface state of the molded article is impaired unfavorably. On the contrary, when the amount is too small, the blow moldability including the melt tension and drawdown resistance cannot be improved.

The styrenic copolymer (C) to be used in the present invention may be a multicomponent copolymer produced by copolymerizing the above-described two components and one or more specified vinyl monomers. Preferred examples of the third components include acrylonitrile, vinyl chloride, α-methylstyrene, brominated styrene and phenyl maleimide. Among them, acrylonitrile is particularly preferred as the third component and a terpolymer comprising at most 504 by weight, preferably at most 404 by weight, of acrylonitrile exhibits a more excellent effect of improving the blow moldability. Although the styrenic copolymer (C) may be a multicomponent copolymer comprising a small amount of another vinyl monomer as a subsidiary component in addition to the above-described components, it is undesirable to use as the copolymer (C) an olefinic monomer such as ethylene, propylene or butene-1 which rather impairs the effect. Particularly a composition comprising 404 by weight or more of an olefin such as ethylene is excluded from the range of the present invention, since the blow moldability including melt tension and drawdown and the surface state of the molded article are seriously impaired.

The styrenic copolymer to be used as the component (C) of the present invention can be easily produced from the above-described monomers by an ordinary radical polymerization method conducted in the presence of a radical polymerization catalyst.

The copolymer to be used as the component (C) of tile present invention may be a graft copolymer comprising the above-described linear styrenic copolymer chemically bonded to a small amount of a vinylic polymer to form a branched or crosslinked structure. Examples of the vinylic monomers constituting the branched or crosslinked segment include acrylic acid, alkyl acrylates, methacrylic acid, alkyl methacrylates, styrene and acrylonitrile. The copolymer having such a branched or crosslinked structure can be converted into a graft copolymer by copolymerizing at least one of the above-described vinylic monomers with a radical-polymerizable organic peroxide in the presence of the above-described linear styrenic copolymer to form a peroxide-containing copolymer and heat-kneading the resultant copolymer. However, the component (C) per se used in the present invention must be a substance flowable at the melt kneading, temperature. When the component (C) is excessively grafted, the flowability and dispersibility are reduced and, therefore, the effect of improving the blow moldability is reduced and the surface state of tile molded article is impaired unfavorably.

The styrenic copolymer to be used as the component (C) amounts to 0.2 to 10 parts by weight, particularly preferably 0.5 to 8 parts by weight, for 100 parts by weight in total of the components (A) and (B). When the amount of the styrenic copolymer is insufficient, the intended effect of the present invention, i.e. improvement in the blow moldability, cannot be obtained and, on the contrary, when it is excessive, the whole system are apt. to gel unfavorably.

A fibrous, granular or plate filler can be further incorporated as a component (D) into the resin composition of the present invention to be blow molded. The filler is effective in improving the mechanical properties, particularly strength and rigidity, of the molted articles.

The fibrous fillers include inorganic fibrous fillers such as fibers of glass, asbestos, carbon, silica, silica/alumina, zirconia, boron nitride, silicon nitride, boron and potassium titanate and fibrous metals, e.g. fibrous stainless steel, aluminum, titanium, copper and brass. A particularly typical fibrous filler is glass fiber.

The granular fillers include carbon black; silicates such as silica, quartz powder, glass beads, glass powder, calcium silicate, aluminum silicate, kaolin, talc, clay, diatomaceous earth and wollastonite; metal oxides such as iron oxide, titanium oxide, zinc oxide and alumina; metal carbonates such as calcium carbonate and magnesium carbonate; metal sulfates such as calcium sulfate and barium sulfate; and silicon carbide, silicon nitride, boron nitride and various metal powders.

The plate fillers include mica, glass flakes and various metal foils.

These inorganic fillers can be used either singly or in the form of a combination of two or more of them. The combination of the fibrous filler, particularly glass fiber with the granular or plate filler is suitable for obtaining molted articles having excellent mechanical strength, dimensional accuracy and electrical properties. Such a combination is effective particularly in improving the blow moldability.

When the filler is used, it is desirable to use a binder or surface-treating agent. Examples of the binder or surface-treating agent include functional compounds such as epoxy, isocyanate, titanate and silane compounds.

The amount of the filler to be used as the component (D) in the present invention is at most 100 ports by weight, preferably at most 70 parts by weight, for 100 parts by weight in total of the resin components (A) and (B). When the amount of the filler is insufficient, the rigidity and strength tend to be lowered and, on the contrary, when it exceeds 100 parts by weight, the moldability is impaired unfavorably.

The resin composition of the present invention may contain a small amount of another thermoplastic resin as assistant in addition to the above-described components.

Such a thermoplastic resin usable herein is any of thermoplastic resins resistant to high temperature. Examples of these resins include styrenic (co)polymers other than those described above, polycarbonates, polyphenylene oxides, polyalkyl acrylates, polyacetals, polysulfones, polyether sulfones, polyether imides, polyether ketones and fluororesins. These thermoplastic resins can be used also in tile form of a mixture of two or more of them.

Known substances usually added to synthetic resins, such as stabilizers, e.g. antioxidants and ultraviolet absorbers, antistatic agents, flame retardants, colorants, e.g. dyes and pigments, lubricants, releasing agents, crystallization accelerators and nucleating agents, can be suitably added to the resin composition of the present invention depending on the required properties.

In the blow molding process of the present invention, the above-described mixture of the polyester resin (A) and the polyamide resin (B) is compounded with the above-described styrenic copolymer (C), and the resulting mixture is melt kneaded or, if necessary, the mixture of the resins (A) and (B) is compounded with the copolymer (C) and other desired components, and the resulting mixture is melt kneaded and blow molded. The components thus melt kneaded may be pelletized on a single-screw or double-screw extruder prior to the blow molding or, alternatively, the mixture may be shaped, as soon as melt kneaded, into a parison for blow molding and then molded.

The blow molding of the present invention can be conducted by an ordinary method on a blow molding machine usually used for blow molding thermoplastic resins. Namely, the method comprises plasticizing the above-described resin composition on an extruder or the like, shaping the plasticized resin composition into a cyclic, molten or softened intermediate parison by extrusion or injection through an annular die, placing the parison in a mold, blowing a gas into the parison to inflate it, and solidifying tile inflated parison by cooling to obtain a hollow molded article. As for the molding conditions of the resin composition of the present invention, the cylinder and die temperatures are preferably 200° to 290° C. When polybutylene terephthalate is used as the component (A), the temperatures the cylinder and die are particularly preferably 230° to 260° C. The temperature of the mold is preferably 40° to 130° C., particularly preferably 80° to 100° C. The gas to be blown into the parison may be air, nitrogen, or the like. From the economic viewpoint, air is usually used under a blow pressure of preferably 3 to 10 kg/cm$^2$. A special blow molding machine such as a three-dimensional blow molding machine may also be used for the molding. In addition, a multi-layer blow-molded article comprising one or more layers made of the composition of the present invention in combination with layers made of other materials can be produced.

As compared with an ordinary polyester resin, polyamide resin or a composition of such a resin, the resin composition of the present invention is enhanded in melt tension and remarkably improved in blow moldability without a parison being drawing down during blow molding, while being freed from the tendency to gelation at a high viscosity, maintaining a stable flowability and capable of efficiently producing a blow molded article of a comparatively large size having a uniform thickness and excellent appearance. Further the present invention is capable of providing blow molded articles having excellent mechanical properties and thermal resistance and usable under considerably severe conditions such as suction and exhaust parts around the engine, e.g. an intake manifold, of an automobile, vessels for high-temperature liquids, chemicals and solvents, vessels such as pipes and floats, and tubes (including those of irregular shapes).

EXAMPLES

The following Examples will further illustrate the present invention, which by no means limit the invention.

EXAMPLES 1 TO 5 AND COMPARATIVE EXAMPLES 1 TO 7

100 parts by weight of a mixture of polybutylene terephthalate (PBT) having an intrinsic viscosity of 1.0 and a polyamide resin (nylon 6 having a relative viscosity of 3.5) was compounded with a styrene/glycidyl methacrylate copolymer (S/G copolymer) as given in Table 1 and the resultant mixture was melt kneaded on a double-screw extruder to form pellets of the resin composition.

Then cylindrical hollow vessels having an average thickness of 2.5 mm and a capacity of 500 cc were produced by molding the pellets on a blow molding machine (S-45ND mfd. by Placo Co., Ltd.) under the conditions comprising a die (diameter of 50 mm, distance of 8 mm) temperature of 250° C., a mold temperature of 80° C. and a blow pressure of 5 kg/cm$^2$. In this step, the moldability [drawdown, breakage during blowing, uniformity of the thickness of the molded articles, and appearance (surface roughness and unevenness)] was examined.

For comparison, a similar test to that described above was repeated even in a case where the conditions of the present invention were not satisfied.

The results are given in Table 1.

The methods for the determination of the characteristic values are as described below.

1) Melt tension

The load necessitated when the resin extruded through an orifice having a diameter of 1 mm at 255° C. was taken up with a capillary rheometer at a drawdown ratio of 10 was determined with a load cell.

2) Melt viscosity

The melt viscosity was determined at a shear rate of 100 sec$^{-1}$ with a capillary rheometer having an orifice having a diameter of 1 mm and a length of 10 mm at 255° C.

3) Blow moldability

Drawdown

The ratio of the time taken for the length of the parison extruded from the blow molding machine to reach 120 mm to the time taken to reach 600 mm was determined as the drawdown index. The drawdown index of a resin completely free from the drawdown was 5 and that of a resin which was instantaneously drawn down was 1.

Breakage during blowing

The breakage of the material during blowing was macroscopically observed.

Uniformity of thickness of molded article

The molded article was cut and the thickness of each of three parts, i.e. upper, middle and lower parts, of the cylinder was measured with a micrometer to determine the thickness variation [differences (%) between tile maximum thickness from the average thickness and the minimum thickness from the average thickness].

Appearance

The surface smoothness (roughness) was macroscopically observed and the results were classified into three ranks of "excellent", "good" and "bad".

EXAMPLES 6 TO 9 AND COMPARATIVE EXAMPLES 8 AND 9

A similar procedure to that of Example 3 was conducted by using various polyamide resin (B) and component (C). The results are given in Table 2.

EXAMPLES 10 TO 13

A similar procedure to that of Examples 3 and 8 was conducted by varying the amount of the component (C) used. The results are given in Table 3.

EXAMPLES 14 TO 16 AND COMPARATIVE EXAMPLES 10 TO 12

A similar procedure to that described above was conducted by using glass fibers as the filler and a composition shown in Table 4. The results are given in Table 4.

TABLE 1

|  | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|---|---|---|
| Compounding ratio |  |  |  |  |  |  |  |  |  |  |  |  |
| component A (pt. by wt.) PBT | 95 | 90 | 80 | 50 | 30 | 100 | 90 | 80 | 50 | 0 | 100 | 0 |
| component B (pt. by wt.) nylon 6 | 5 | 10 | 20 | 50 | 70 | 0 | 10 | 20 | 50 | 100 | 0 | 100 |
| component C (pt. by wt.) S/G*[1] | 2.5 | 2.5 | 2.5 | 2.5 | 2.5 | 0 | 0 | 0 | 0 | 0 | 2.5 | 2.5 |
| Properties |  |  |  |  |  |  |  |  |  |  |  |  |
| melt tension (g) | 6.7 | 9.5 | 12 | 15 | 13 | 0.16 | 0.18 | 0.22 | 0.33 | 0.25 | 5.9 | 2.5 |
| melt viscosity (P) [shear rate: 100 sec$^{-1}$] | 18000 | 20000 | 23500 | 24500 | 19500 | 4700 | 4950 | 5200 | 5900 | 6600 | 14000 | 12500 |
| Blow moldability |  |  |  |  |  |  |  |  |  |  |  |  |
| drawdown index | 2.40 | 2.44 | 2.55 | 3.03 | 2.85 | 1.05 | 1.04 | 1.11 | 1.15 | 1.11 | 2.33 | 1.80 |
| breakage during blowing | none | none | none | none | none |  |  |  |  |  | none | none |
| thickness uniformity (%) | 14 | 11 | 9 | 8 | 13 | unmoldable | unmoldable | unmoldable | unmoldable | unmoldable | 15 | 20 |
| appearance | excellent | excellent | excellent | excellent | excellent |  |  |  |  |  | excellent | good |

*[1]Composition (wt. ratio):
S/G: styrene/glycidyl methacrylate copolymer (80/20).

TABLE 2

|  | Ex. 6 | Ex. 7 | Ex. 8 | Ex. 9 | Comp. Ex. 8 | Comp. Ex. 9 |
|---|---|---|---|---|---|---|
| Compounding ratio |  |  |  |  |  |  |
| component A (pt. by wt.) PBT | 80 | 80 | 80 | 80 | 80 | 80 |
| component B (pt. by wt.) | nylon 66 20 | nylon 12 20 | nylon 6 20 | nylon 66 20 | nylon 66 20 | nylon 12 20 |
| component C (pt. by wt.)*[1] | S/G 2.5 | S/G 2.5 | S/AN/G 1.5 | S/AN/G 1.5 | 0 | 0 |
| Properties |  |  |  |  |  |  |
| melt tension (g) | 3.6*[2] | 16 | 17 | 6.1*[2] | 0.10*[2] | 0.34 |
| melt viscosity (P) [shear rate: 100 sec$^{-1}$] | 5100*[2] | 15000 | 24000 | 6900*[2] | 3200*[2] | 4400 |
| Blow moldability |  |  |  |  |  |  |
| drawdown index | 2.27*[2] | 3.04 | 2.60 | 2.38*[2] | 1.05*[2] | 1.14 |
| breakage during blowing | none | none | none | none | unmoldable | unmoldable |
| thickness uniformity (%) | 15 | 8 | 10 | 12 |  |  |
| appearance | excel- | excel- | excel- | excel- |  |  |

TABLE 2-continued

|  | Ex. 6 | Ex. 7 | Ex. 8 | Ex. 9 | Comp. Ex. 8 | Comp. Ex. 9 |
| --- | --- | --- | --- | --- | --- | --- |
|  | lent | lent | lent | lent |  |  |

*¹Composition (wt. ratio):
S/G: styrene/glycidyl methacrylate copolymer (80/20)
S/AN/G: styrene/acrylonitrile/glycidyl methacrylate copolymer (56/24/20)
*²Determination temp.: 270° C.

TABLE 3

|  | Ex. 10 | Ex. 3 | Ex. 11 | Ex. 12 | Ex. 8 | Ex. 13 |
| --- | --- | --- | --- | --- | --- | --- |
| Compounding ratio |  |  |  |  |  |  |
| component A (pt. by wt.) PBT | 80 | 80 | 80 | 80 | 80 | 80 |
| component B (pt. by wt.) nylon 6 | 20 | 20 | 20 | 20 | 20 | 20 |
| component C (pt. by wt.)*¹ | S/G | S/G | S/G | S/AN/G | S/AN/G | S/AN/G |
|  | 1.0 | 2.5 | 5.0 | 0.5 | 1.5 | 3.0 |
| Properties |  |  |  |  |  |  |
| melt tension (g) | 10 | 12 | 11 | 13 | 17 | 21 |
| melt viscosity (P) [shear rate: 100 sec⁻¹] | 18500 | 23500 | 27000 | 21000 | 24000 | 28500 |
| Blow moldability |  |  |  |  |  |  |
| drawdown index | 2.39 | 2.55 | 2.58 | 2.41 | 2.60 | 2.79 |
| breakage during blowing | none | none | none | none | none | none |
| thickness uniformity (%) | 15 | 9 | 11 | 13 | 10 | 14 |
| appearance | good | excellent | excellent | good | excellent | good |

*¹Composition (wt. ratio):
S/G: styrene/glycidyl methacrylate copolymer (80/20)
S/AN/G: styrene/acrylonitrile/glycidyl methacrylate copolymer (56/24/20)

TABLE 4

|  | Ex. 14 | Ex. 15 | Ex. 16 | Comp. Ex. 10 | Comp. Ex. 11 | Comp. Ex. 12 |
| --- | --- | --- | --- | --- | --- | --- |
| Compounding ratio |  |  |  |  |  |  |
| component A (pt. by wt.) PBT | 80 | 80 | 80 | 100 | 100 | 80 |
| component B (pt. by wt.) | 20 | 20 | 20 | 0 | 0 | 20 |
| component C (pt. by wt.)*¹ | S/AN/G | S/AN/G | S/G | S/AN/G | S/G |  |
|  | 1.5 | 1.5 | 2.5 | 1.5 | 2.5 | 0 |
| component D (pt. by wt.) glass fiber | 15 | 30 | 15 | 15 | 15 | 15 |
| Properties |  |  |  |  |  |  |
| melt tension (g) | 45 | 52 | 29 | 41 | 17 | nondeterminable |
| melt viscosity (P) [shear rate: 100 sec⁻¹] | 43000 | 46000 | 45000 | 39000 | 37100 | 7500 |
| Blow moldability |  |  |  |  |  |  |
| drawdown index | 4.55 | 4.61 | 4.59 | 4.32 | 4.17 | 1.10 |
| breakage during blowing | none | none | none | none | none |  |
| thickness uniformity (%) | 21 | 19 | 21 | 22 | 25 | unmoldable |
| appearance | good | good | good | good | good |  |

*¹Composition (wt. ratio):
S/G: styrene/glycidyl methacrylate copolymer (80/20)
S/AN/G: styrene/acrylonitrile/glycidyl methacrylate copolymer (56/24/20)

What is claimed is:

1. A blow-moldable resin composition which includes 100 parts by weight of a melt-blended resin component consisting essentially of:
   (A) 1 to 99 parts by weight of a thermoplastic polyester resin mainly comprising terephthalic acid or the ester forming derivative thereof, and an aliphatic dihydroxy compound having 2 to 4 carbon atoms;
   (B) 99 to 1 parts by weight of a thermoplastic polyamide resin;
   (C) 0.2 to 10 parts by weight of a styrenic copolymer consisting essentially of 40 to 97% by weight of styrene, 60 to 3% by weight of a glycidyl ester of an α,β-unsaturated acid and 0 to 50% by weight of a vinylic monomer other than an olefinic monomer; and optionally
   (D) 0 to 100 parts by weight of at least one member filler material selected from the group consisting of fibrous, granular and plate-like fillers.

2. A resin composition according to claim 1, wherein the vinylic monomer is present in the sytrenic copolymer (C), and is at least one member selected from the group consisting of acrylonitrile, vinyl chloride, α-methylstyrene, brominated styrene and phenyl maleimide 3. A resin composition according to claim 1, wherein the thermoplastic polyester resin (A) is a polymer or copolymer comprised of butylene terephthalate repeating units.

4. A resin composition according to claim 1, wherein the thermoplastic polyester resin (A) is present in the resin component in an amount from 50 to 99 parts by weight, and wherein the thermoplastic polyamide resin (B) is present in the resin component in an amount from 50 parts to 1 part by weight.;

5. A blow-molded article which is comprised of the resin composition according to claim 1.

* * * * *